United States Patent
Shamskhorzani et al.

(10) Patent No.: US 11,066,314 B2
(45) Date of Patent: Jul. 20, 2021

(54) WATER TREATMENT AERATOR HAVING BUBBLE DIFFUSER

(71) Applicant: BioMicrobics, Inc., Lenexa, KS (US)

(72) Inventors: Reza Shamskhorzani, Lawrence, KS (US); Heather Renee Anderson, Grain Valley, MO (US)

(73) Assignee: BioMicrobics, Inc., Lenexa, KS (US)

( * ) Notice: Subject to any disclaimer, the term of this patent is extended or adjusted under 35 U.S.C. 154(b) by 73 days.

(21) Appl. No.: 16/397,799

(22) Filed: Apr. 29, 2019

(65) Prior Publication Data

US 2020/0339455 A1  Oct. 29, 2020

(51) Int. Cl.
| | |
|---|---|
| *C02F 3/22* | (2006.01) |
| *C02F 3/20* | (2006.01) |
| *B01F 3/04* | (2006.01) |
| *C02F 3/10* | (2006.01) |

(52) U.S. Cl.
CPC .......... *C02F 3/223* (2013.01); *B01F 3/04241* (2013.01); *C02F 3/10* (2013.01); *C02F 3/20* (2013.01); *B01F 2003/04319* (2013.01); *B01F 2215/0052* (2013.01)

(58) Field of Classification Search
CPC ........ B01F 3/04241; B01F 2003/04319; B01F 2215/0052; C02F 3/223; C02F 3/10; C02F 3/20
USPC .................................... 210/150, 170.06, 628
See application file for complete search history.

(56) References Cited

U.S. PATENT DOCUMENTS

| | | | |
|---|---|---|---|
| 3,852,384 A * | 12/1974 | Bearden | B01F 3/04517 261/77 |
| 3,966,599 A | 6/1976 | Burkhead | |
| 3,966,608 A | 6/1976 | Mason et al. | |
| 3,972,965 A | 8/1976 | Higgins | |
| 5,156,742 A | 10/1992 | Struewing | |
| 5,609,754 A | 3/1997 | Stuth | |
| 5,752,618 A * | 5/1998 | Trebitz | A47G 19/12 220/642 |
| 6,017,020 A * | 1/2000 | Baughman | B01F 3/0451 261/36.1 |
| 6,224,041 B1 | 5/2001 | Rebori et al. | |
| 6,554,996 B1 | 4/2003 | Rebori | |
| 2005/0151281 A1* | 7/2005 | Tharp | B01F 3/04269 261/122.1 |
| 2015/0210573 A1 | 7/2015 | Conner et al. | |
| 2016/0075578 A1 | 3/2016 | Malone | |

* cited by examiner

*Primary Examiner* — Nam X Nguyen
*Assistant Examiner* — Julia L. Wun
(74) *Attorney, Agent, or Firm* — Hovey Williams LLP

(57) ABSTRACT

An aerator assembly for wastewater treatment includes a draft tube and an air supply assembly. The draft tube includes a sidewall and presents open top and bottom tube ends. The air supply assembly includes an air supply conduit and a diffuser body. The diffuser body has an inlet aperture and a bubble generator connected to the inlet. The inlet aperture is connected to the air supply conduit such that the bubble generator receives air from a source of air, to which the air supply conduit is connected. The bubble generator has a plurality of air openings for generating fine air bubbles. The diffuser body is sealingly engaged to the sidewall adjacent the bottom tube end so as restrict upward flow of wastewater through the draft tube past the diffuser body.

15 Claims, 9 Drawing Sheets

WATER TREATMENT AERATOR HAVING BUBBLE DIFFUSER

FIELD OF THE DISCLOSURE

The present invention relates to aerators for wastewater treatment systems, and more particularly, to a draft tube and an air supply assembly of the aerator.

BACKGROUND

Known aerators are utilized to increase the oxygen content of wastewater, i.e., to "oxygenate" the wastewater, in a body or container of wastewater. Such known aerators placed into a body of wastewater typically incorporate a draft tube having open bottom and top ends. The bottom end is positioned at a depth of the wastewater to be aerated, and the top end extends above a surface of the wastewater. The aerators include a mechanism for drawing the wastewater through the open bottom of the draft tube, displacing the wastewater vertically while mixing the wastewater with air, and expelling the wastewater from the draft tube at the open top. In some aerators, the mechanism is a rotary device such as a pump or an impeller, while in other aerators, the device is a conduit for injecting pressurized air into the draft tube (e.g., an "air lift").

Typical air lifts inject air into the wastewater to facilitate displacing the wastewater vertically. The air lifts enhance mixing and oxygen transfer into the wastewater to aid in the treatment of the wastewater in aerobic water/wastewater treatment processes. However, typical air lifts rely on drawing the wastewater into the draft tube from the open bottom of the draft tube, which can result in solids in the wastewater being drawn into the draft tube as well. In addition, typical air lifts produce air bubbles that are relatively large and are not evenly distributed across the area of the draft tube, which results in reduced oxygenation and oxygen transfer efficiency of the aerator.

BRIEF DESCRIPTION

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present disclosure will be apparent from the following detailed description of the embodiments and the accompanying drawing figures.

In one aspect, an aerator assembly for wastewater treatment is provided. The aerator assembly includes an upright draft tube having a sidewall and presenting an open top tube end and an open bottom tube end. The aerator assembly also includes an air supply assembly having an air supply conduit connectable to a source of air. The air supply assembly further includes a diffuser body that has an inlet aperture and a bubble generator fluidly connected to the inlet aperture. The inlet aperture is fluidly connected to the air supply conduit such that the bubble generator is configured to receive air from the source of air. The bubble generator has a plurality of air openings defined therein. The diffuser body sealingly engages the sidewall adjacent the bottom tube end so as to restrict upward flow of wastewater through the draft tube past the diffuser body.

In another aspect, a wastewater treatment module for use in treating wastewater is provided. The treatment module includes an upright draft tube having a sidewall and presenting an open top tube end. The treatment module also includes an air supply assembly having an air supply conduit connectable to a source of air. The air supply assembly includes an air outlet connected to the air supply conduit such that the outlet is configured to receive air from the source of air. The air outlet is positioned within the draft tube spaced from the top tube end. The sidewall includes an open window spaced between the air outlet and the top tube end, such that air moving upwardly toward the top tube end is operable to draw wastewater into the draft tube through the open window.

In yet another aspect, an aerator assembly for wastewater treatment is provided. The aerator assembly includes an upright draft tube including a sidewall and presenting an open top tube end. The aerator assembly also includes an air supply assembly including an air supply conduit connectable to a source of air. The air supply assembly includes an air outlet connected to the air supply conduit such that the outlet is configured to receive air from the source of air. The air outlet is positioned within the draft tube spaced from the top tube end such that a portion of the sidewall extends above the air outlet. The portion of the sidewall is sectioned into a plurality of variably cross-sectionally dimensioned tube sections, such that the portion of the sidewall presents an internal step between adjacent ones of the tube sections.

In still another aspect, an aerator assembly for wastewater treatment is provided. The aerator assembly includes an air supply assembly including an air supply conduit connectable to a source of air. The air supply assembly includes an air outlet connected to the air supply conduit such that the outlet is configured to receive air from the source of air. The aerator assembly also includes an upright draft tube including a sidewall and presenting an open top tube end. The sidewall has a plurality of vertically spaced conduit-receiving slots. The air supply conduit is selectively received in a respective one of the conduit-receiving slots to position the air outlet within the draft tube. Vertical spacing of the air outlet relative to the top tube end is variable depending on the conduit-receiving slot in which the air supply conduit is received.

In a further aspect, a wastewater treatment module for use in treating wastewater is provided. The treatment module includes treatment media presenting opposite top and bottom margins. The treatment module also includes an upright draft tube including a sidewall and presenting an open top tube end. The draft tube extends through the treatment media. The sidewall includes an outwardly projecting support flange that rests against the top margin of the treatment media, such that the draft tube is supported by the treatment media. The draft tube includes a handle located above the support flange to facilitate installation and removal of the draft tube relative to the treatment media.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

Figure 1:
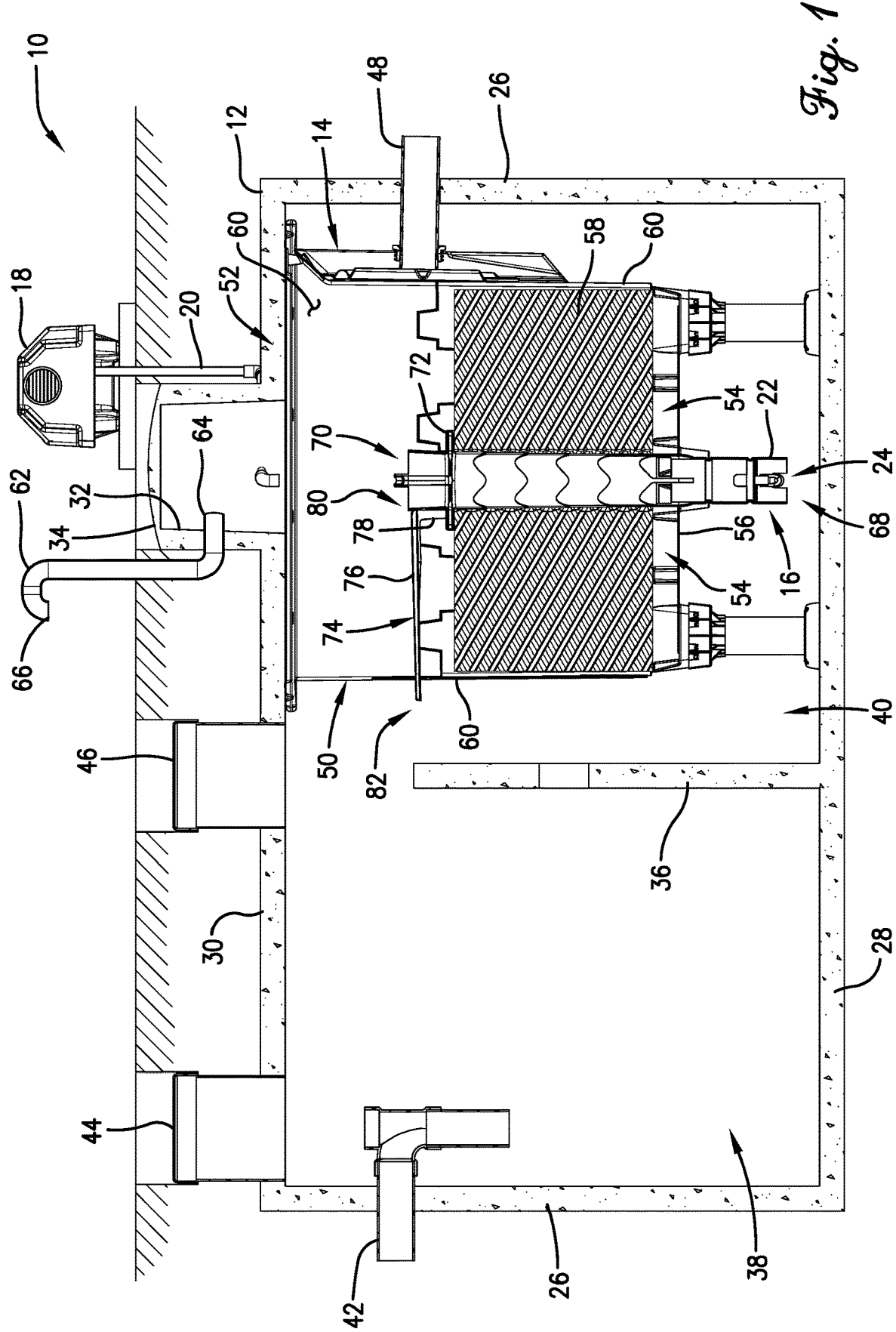
FIG. 1 is a section view of a wastewater treatment system in accordance with a preferred embodiment of the present invention.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein. While the drawings do not necessarily provide exact dimensions or tolerances for the illustrated components or structures, the drawings are to scale with respect to the relationships between the components of the structures illustrated in the drawings.

DETAILED DESCRIPTION

The following detailed description of embodiments of the disclosure references the accompanying figures. The embodiments are intended to describe aspects of the disclosure in sufficient detail to enable those with ordinary skill in the art to practice the disclosure. The embodiments of the disclosure are illustrated by way of example and not by way of limitation. Other embodiments may be utilized, and changes may be made without departing from the scope of the claims. The following description is, therefore, not limiting. The scope of the present disclosure is defined only by the appended claims, along with the full scope of equivalents to which such claims are entitled.

In this description, references to "one embodiment," "an embodiment," or "embodiments" mean that the feature or features referred to are included in at least one embodiment of the disclosure. Separate references to "one embodiment," "an embodiment," or "embodiments" in this description do not necessarily refer to the same embodiment and are not mutually exclusive unless so stated. Specifically, a feature, component, action, step, etc. described in one embodiment may also be included in other embodiments but is not necessarily included. Thus, particular implementations of the present disclosure can include a variety of combinations and/or integrations of the embodiments described herein.

In the following specification and the claims, reference will be made to several terms, which shall be defined to have the following meanings. The singular forms "a," "an," and "the" include plural references unless the context clearly dictates otherwise. "Optional" or "optionally" means that the subsequently described feature, event, or circumstance may or may not be required or occur, and that the description includes instances with or without such element.

Approximating language, as used herein throughout the specification and the claims, may be applied to modify any quantitative representation that could permissibly vary without resulting in a change in the basic function to which it is related. Accordingly, a value modified by a term or terms, such as "about," "approximately," and "substantially" are not to be limited to the precise value specified. In at least some instances, the approximating language may correspond to the precision of an instrument for measuring the value. Here and throughout the specification and claims, range limitations may be combined and/or interchanged, and such ranges are identified and include all the sub-ranges contained therein unless context or language indicates otherwise.

As used herein, directional references, such as, "top," "bottom," "front," "back," "side," and similar terms are used herein solely for convenience and should be understood only in relation to each other. For example, a component might in practice be oriented such that faces referred to herein as "top" and "bottom" are in practice sideways, angled, inverted, etc. relative to the chosen frame of reference.

FIG. 1 is a section view of a wastewater treatment system 10, in accordance with a preferred embodiment of the present invention. The wastewater treatment system 10 is illustrated as a typical septic tank system, although the wastewater treatment system 10 may include, for example and without limitation, any type of residential and/or commercial onsite wastewater treatment system. The terms "wastewater" and "water" may be used interchangeably throughout the specification. In addition, as used herein, the terms "wastewater" and "water" refer to any water stream entering the wastewater treatment system 10 and having foreign matter therein to be removed (also referred to herein as "influent") and any treated water leaving the wastewater treatment system 10 (also referred to herein as "effluent").

With reference to FIG. 1, the wastewater treatment system 10 includes a septic tank 12, a wastewater treatment module 14 having an aerator 16 positioned therein, and a blower unit 18 (i.e., a "source of air") for supplying air to the aerator 16 via an air line 20. The aerator 16 includes an upright draft tube 22 and an air supply assembly 24. The air line 20 is coupled in fluid communication to the air supply assembly 24 of the aerator 16 to create an air lift. As used herein, the term "air" is preferably used in its general sense and refers to the normal mixture of gases that make up the atmosphere. However, according to certain aspects of the present invention, air may alternately refer to a particular gas, mixture of gases, or mixture of liquid and gas specifically supplied to the aerator 16 in a form not naturally available form the atmosphere.

In the exemplary embodiment, the septic tank 12 includes a plurality of sidewalls 26, a bottom wall 28, and a top wall 30. The top wall 30 has a man hole 32 defined therein. A removable cover 34 closes the man hole 32. A vent pipe 62 is coupled to a sidewall of the man hole 32. The vent pipe 62 has a first end 64 that extends into the septic tank 12 and a second end 66 in fluid communication with the atmosphere. As such, the internal volume of the septic tank 12 is 'vented,' or coupled in fluid communication, to the atmosphere. In the exemplary embodiment, the septic tank 12 is a dual chamber septic tank having a dividing wall 36, in part, defining a first chamber 38 and a second chamber 40. However, according to certain aspects of the present invention, the septic tank 12 may include a single chamber septic tank or a septic tank having more than two separate chambers.

An influent pipe 42 extends through an upper portion of the sidewall 26 of the first chamber 38. A first inspection pipe 44 extends upward through the top wall 30 to facilitate inspection of and access to the first chamber 38. A second inspection pipe 46 extends upward through the top wall 30 to facilitate inspection of and access to the second chamber 40. An effluent pipe 48 extends through the opposing sidewall 26 of the second chamber 40 and is coupled in fluid communication to the wastewater treatment module 14.

In the exemplary embodiment, the wastewater treatment module 14 includes a housing shell 50 that has an open top 52 and one or more bottom openings 54 defined through a shell bottom wall 56. A wastewater treatment media 58 is contained within the housing shell 50 and surrounds the aerator 16. The wastewater treatment media 58 extends outwardly from the aerator 16 to the sidewalls 60 of the housing shell 50. In addition, the wastewater treatment media 58 includes a top margin defined upward toward the open top 52 and a bottom margin defined downward toward the shell bottom wall 56. In the exemplary embodiment, the housing shell 50 is generally rectangular in shape. However, according to certain aspects of the present invention, the housing shell 50 may be any alternative shape that enables the wastewater treatment module 14 to function as described herein, including, for example, circular, oval, polygonal, and the like.

The wastewater treatment media 58 is supported within the housing shell 50 by the shell bottom wall 56, where the one or more bottom openings 54 allow wastewater to pass through the wastewater treatment media 58. In accordance with one aspect of the present invention, the wastewater treatment media 58 is of the fixed-film type system. The wastewater treatment media 58 includes a porous biofilm carrier medium that operates to provide a structure to support growth of a biomass film that digests waste material contained in the wastewater. The wastewater treatment media 58 may be fabricated from any suitable porous material, including, for example, and without limitation, plastics, fabrics, organic materials (e.g., fibrous peat), etc., that can support aerobic microbial growth. In one aspect of the present invention, the wastewater treatment media 58 is fabricated from a plurality of plastic carrier media forms that are configured to fit together to form a porous carrier media block having a central opening for receiving the aerator 16 therethrough. However, in accordance with other aspects of the present invention, the wastewater treatment media 58 may include loose fill carrier media that is supported in foraminous enclosures.

In the exemplary embodiment, as described above, the aerator 16 extends through the wastewater treatment media 58. The draft tube 22 of the aerator 16 has an open bottom tube end 68 that extends downward through the shell bottom wall 56, an open top tube end 70 that extends upward through the wastewater treatment media 58, and a sidewall 120 extending between the bottom tube end 68 and the top tube end 70. As used herein with references to the bottom tube end 68, the term "open" refers to at least a portion of the tube bottom end having a passage therethrough permitting a fluid flow therethrough. That is, the bottom tube end 68 does not have to be completely open to coincide with the sidewall 120 of the draft tube 22. However, in certain aspects of the present invention, the draft tube 22 may have a closed bottom end.

Adjacent the top tube end 70, the draft tube 22 includes a support flange 72 that extends radially outward for supporting the aerator 16 on the upper surface of the wastewater treatment media 58. In addition, a recirculation trough 74 is releasably coupled to the top tube end 70 of the draft tube 22 to recycle a portion of the wastewater. The recirculation trough 74 includes an open top channel portion 76 and a support portion 78. The support portion rests on the support flange 72 and operates to position a first end 80 of the open top channel portion 76 proximate the top tube end 70 of the draft tube 22. The open top channel portion 76 is an elongated channel or through structure having the open top located above a wastewater liquid level in the wastewater treatment module 14. The open top channel portion 76 extends through a sidewall 60 of the housing shell 50 and terminates at a second end 82 located outside of the wastewater treatment module 14.

Figure 2:
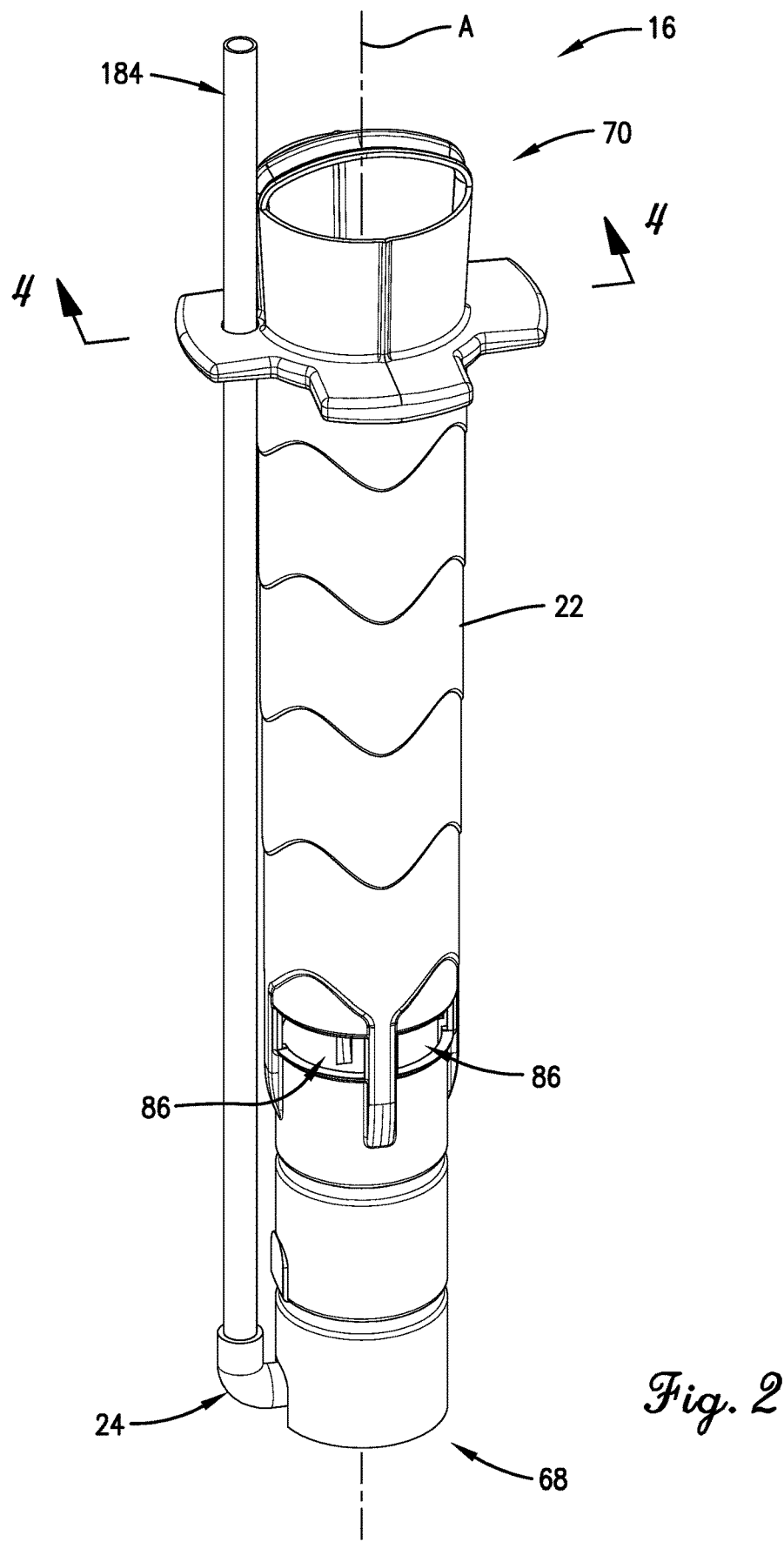
FIG. 2 is a perspective view of an aerator forming part of the wastewater treatment system shown in FIG. 1.
Figure 3:
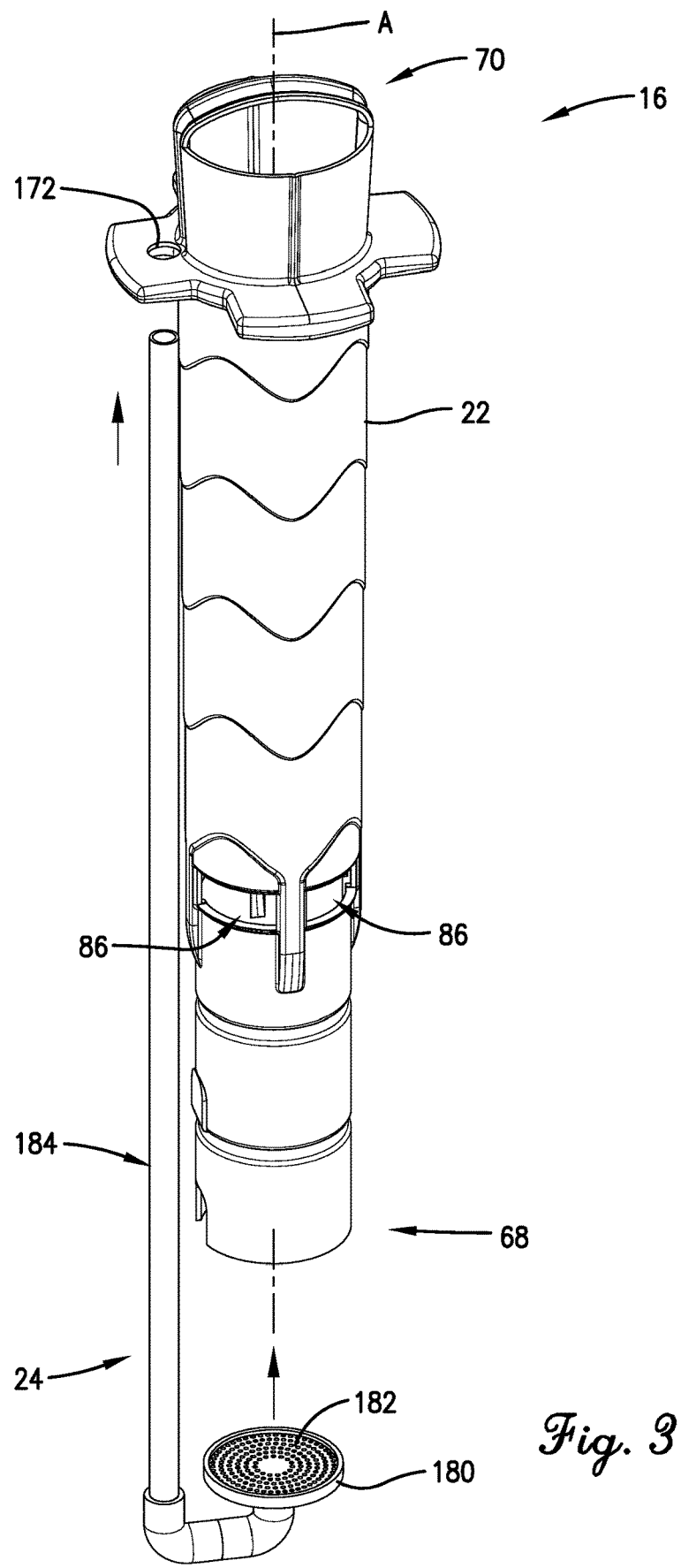
FIG. 3 is an exploded perspective view of the aerator shown in FIG. 2.
Figure 4:
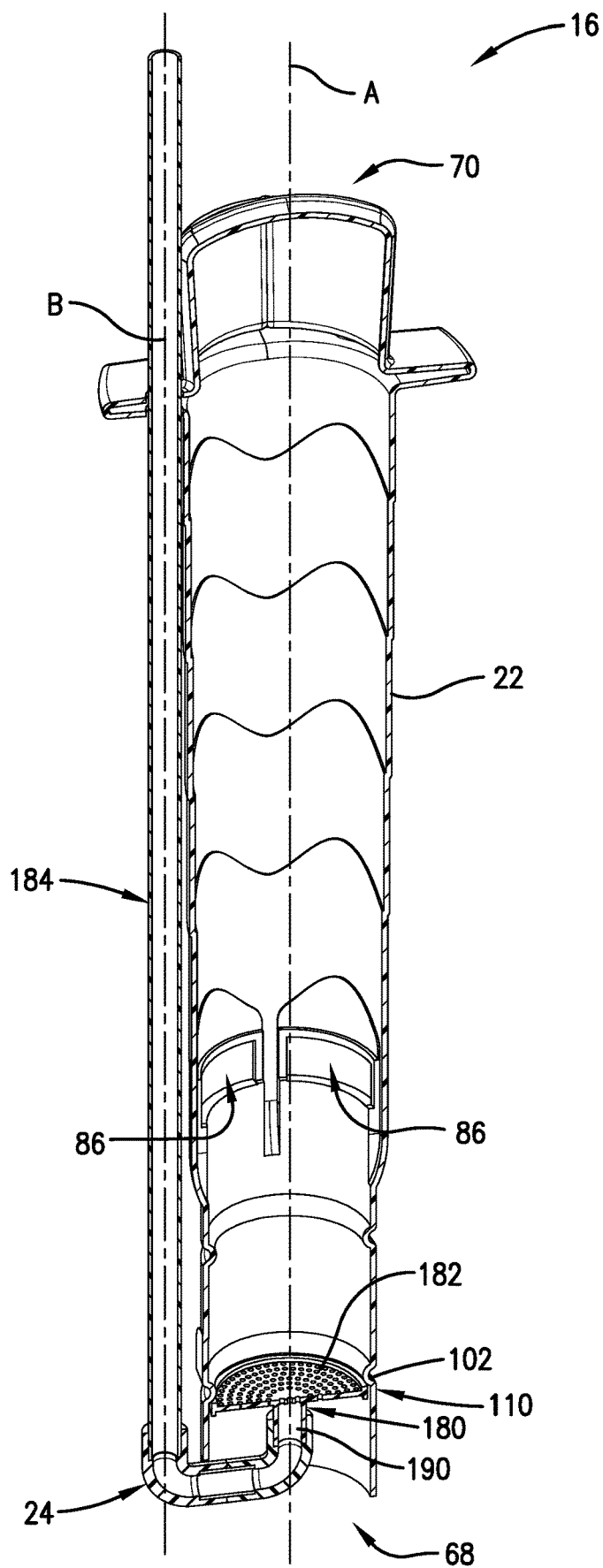
FIG. 4 is a sectional view of the aerator shown in FIG. 2.

FIG. 2 is a perspective view of the aerator 16, in accordance with a preferred embodiment of the present invention. FIG. 3 is an exploded perspective view of the aerator 16 shown in FIG. 2. FIG. 4 is a sectional view of the aerator 16 shown in FIG. 2. The aerator 16 operates to recirculate the wastewater through the wastewater treatment media 58 (shown in FIG. 1) and to introduce air (e.g., atmospheric air, oxygen, nitrogen, etc.) into the recirculating wastewater to promote aerobic microbial growth in the wastewater treatment media 58. As described above, the aerator 16 includes the air supply assembly 24, which is coupled to the blower unit 18 (shown in FIG. 1) via the air line 20 (shown in FIG. 1).

In the exemplary embodiment, the air supply assembly 24 includes a diffuser body 180 having an inlet 190 (or "inlet aperture") and a bubble generator 182 (also referred to as a "bubble diffuser") defining an air outlet. However, in certain aspects of the present invention, the bubble generator 182 may alternatively comprise a single air outlet. In the exemplary embodiment, the diffuser body 180 is coupled to an air supply conduit 184, which is turn is coupled to the air line 20 for receiving air from the blower unit 18. The diffuser body 180 is sized to seal (e.g., to close) the bottom tube end 68 of the draft tube 22 by sealingly engaging the sidewall 120 adjacent the bottom tube end 68 so as restrict upward flow of wastewater through the draft tube 22 past the diffuser body 180. That is, the diffuser body 180 is configured to prevent or at least substantially limit ingress of the wastewater and solids through the bottom tube end 68 of the draft tube 22. Rather, the wastewater is ingested into the draft tube 22 through one or more sidewall open windows 86 defined in the draft tube 22 as air bubbles expelled by the bubble generator 182 move upwardly toward the top tube end 70, thereby drawing the wastewater into the draft tube 22 through the sidewall open windows 86. As used herein, the terms "seal," "sealing," and "sealed" with respect to the diffuser body 180 and the draft tube 22, refers to a state or condition wherein the influent is prevented from flowing upward through the draft tube 22 past the diffuser body 180 by the draft tube 22 and the diffuser body 180 cooperatively forming a barrier.

Figure 5:
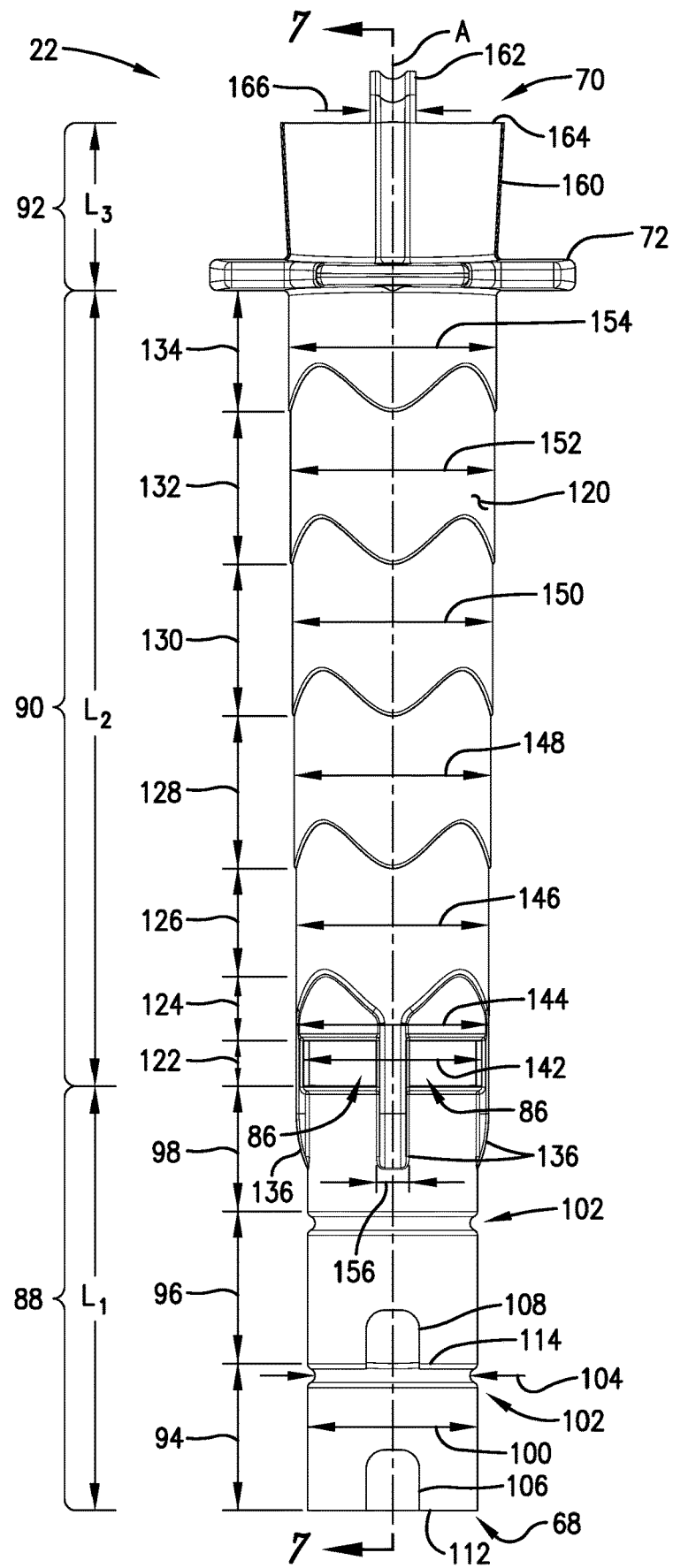
FIG. 5 is a side view of a draft tube for use with the aerator shown in FIG. 2.
Figure 6:
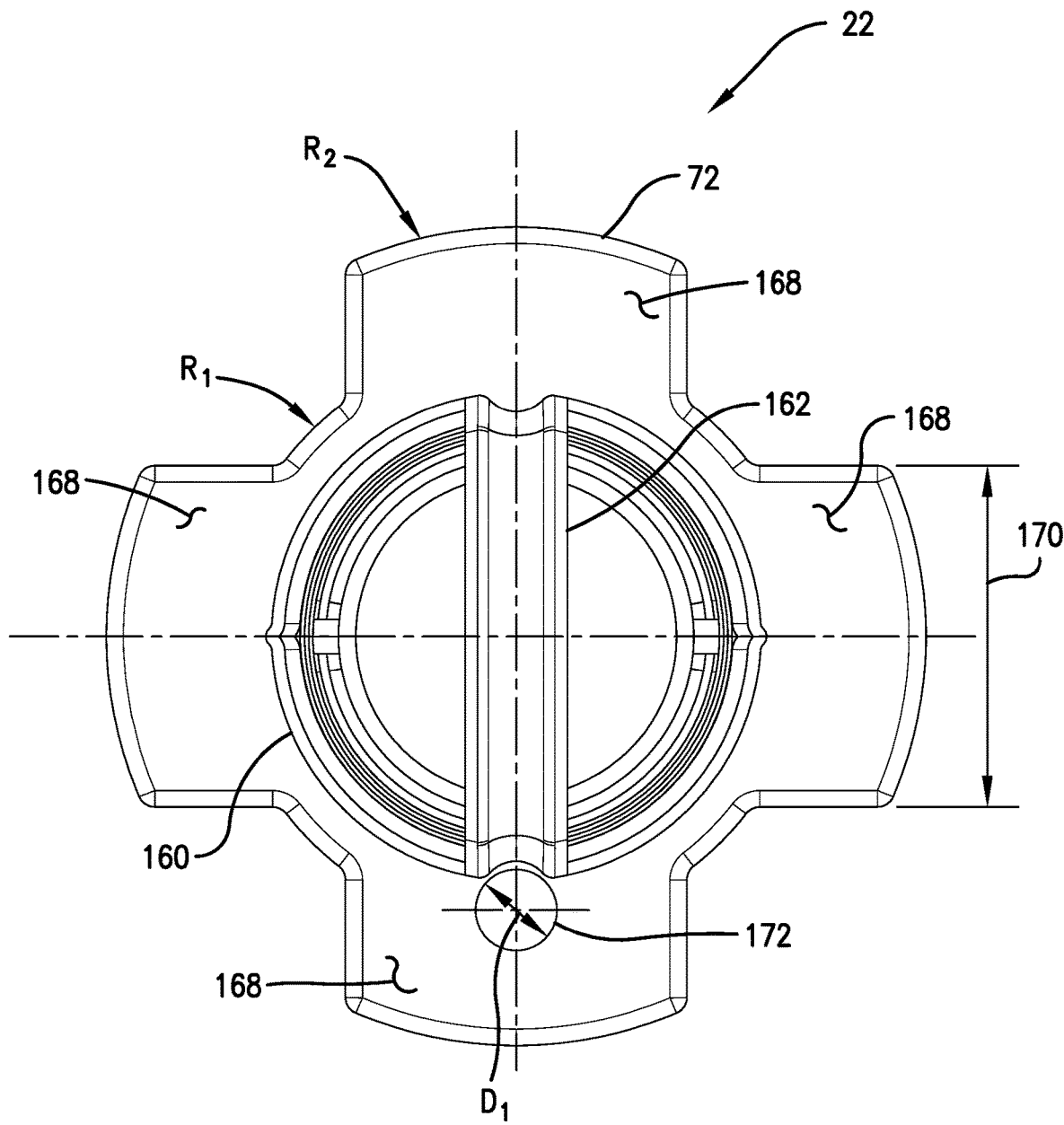
FIG. 6 is a top view of the draft tube shown in FIG. 5.
Figure 7:
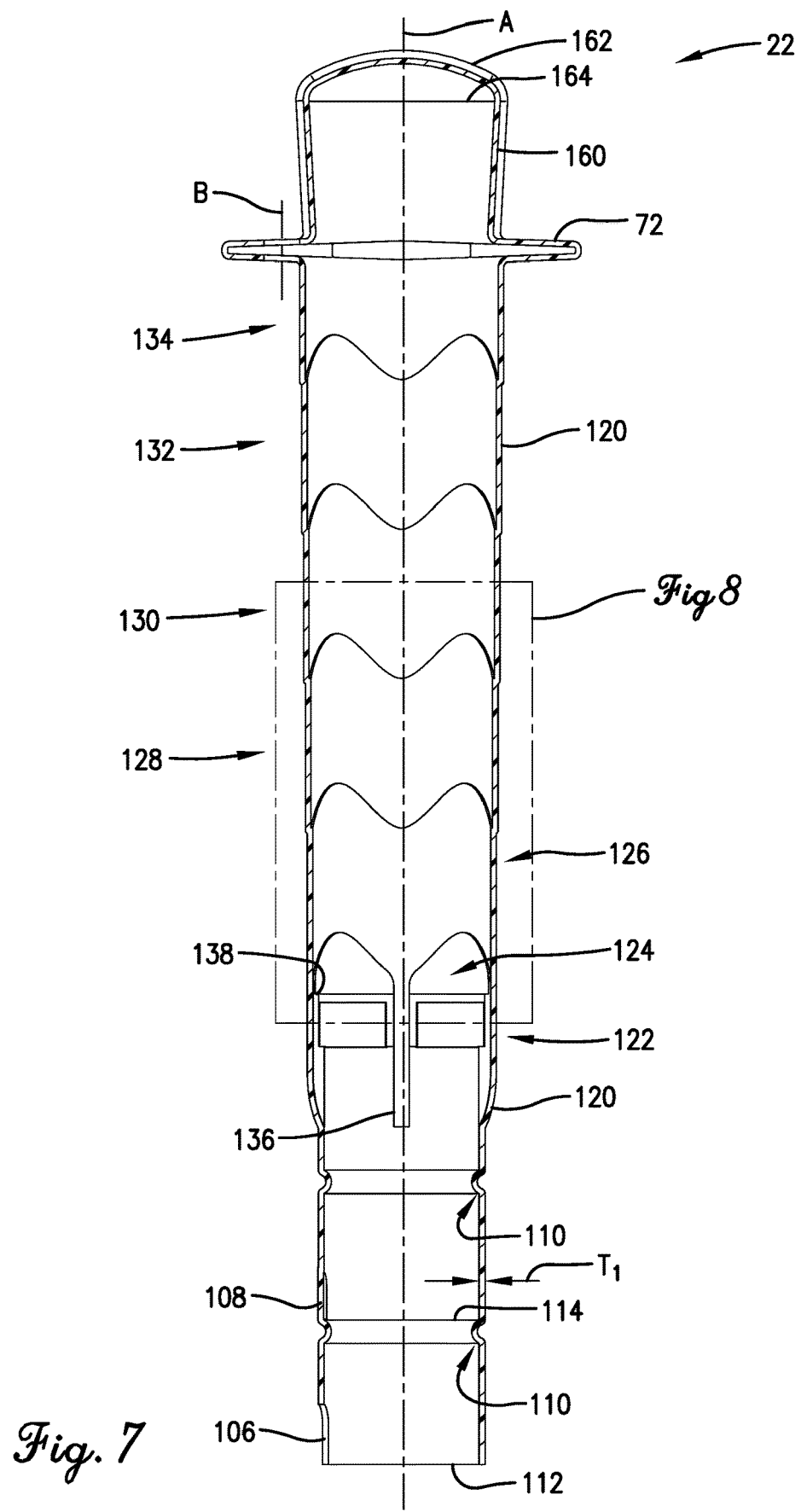
FIG. 7 is a section view of the draft tube taken along line 7-7 of FIG. 5.
Figure 8:
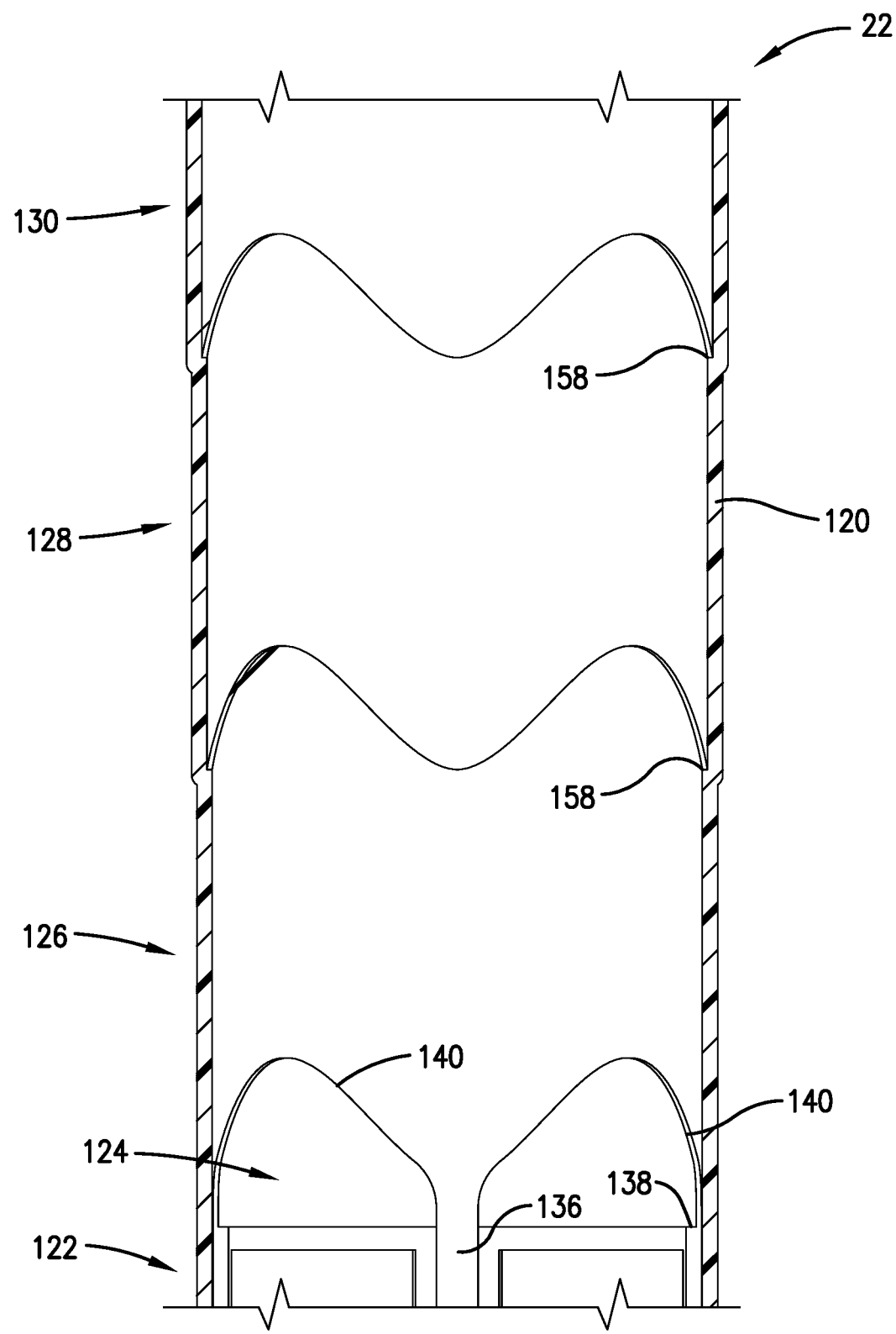
FIG. 8 is an enlarged portion of the section view of the draft tube shown in FIG. 7.

FIG. 5 is a side view of the draft tube 22 forming part of the aerator 16 shown in FIG. 2; FIG. 6 is a top view of the draft tube shown in FIG. 5; FIG. 7 is a section view of the draft tube shown in FIG. 5 taken about line 7-7; and FIG. 8 is an enlarged portion of the section view of the draft tube shown in FIG. 7. Referring to FIGS. 5-8, the draft tube 22 is generally an elongated circular shaped tube defining a central axis "A." The draft tube 22 is fabricated with a generally constant wall thickness $T_1$ of its sidewall 120 and is therefore hollow, defining a fluid chamber therein. That is, the wall thickness $T_1$ is substantially the same at any portion of the draft tube 22, except as may be noted herein. In the exemplary embodiment, the wall thickness $T_1$ is in the range between and including about one hundred and eighty-five thousandths of an inch (0.185") to about one hundred and fifty thousandths of an inch (0.150"). However, in other aspects of the present invention, the wall thickness $T_1$ may be any alternative wall thickness that enables the draft tube 22 to function as described herein.

As discussed herein, the draft tube 22 presents the bottom tube end 68 and the top tube end 70. In the exemplary embodiment, the draft tube 22 has a substantially circular cross section along its length in a plane that is substantially perpendicular to the central axis "A." However, in other aspects of the present invention, the draft tube 22 may have any cross-sectional shape that enables the draft tube 22 to function as described herein, including, for example, rectangular, oval, polygonal, and the like.

In accordance with the present embodiment, the draft tube 22 has a lower adjustable extension portion 88, a central aeration portion 90, and an upper outlet portion 92 coupled together in serial arrangement. In the exemplary embodiment, the draft tube 22 is fabricated as a unitary component. However, in other aspects of the present invention, the draft tube 22 may be fabricated as two or more connected components.

In the exemplary embodiment, the lower adjustable extension portion 88 has a generally constant outer diameter, labelled in FIG. 5 by reference number 100, along its length $L_1$, which extends from the bottom of the draft tube 22 upward to the one or more open windows 86. In the exemplary embodiment, the lower adjustable extension portion 88 in formed by three (3) tube sections in serial arrangement; a bottom tube section 94, a central tube section 96, and an attachment tube section 98. However, other aspects of the present invention may have fewer or more than three (3) tube sections.

In the exemplary embodiment, the bottom tube section 94 and the central tube section 96 have substantially the same size and form. Each of tube sections 94 and 96 include a sidewall indention 102 (or "groove") defined at a top of the respective tube section. The sidewall indentions 102 define an inwardly projecting structure or inner rib 110 that functions as a stop or positioning element for the diffuser body 180 of the air supply assembly 24, as illustrated in FIG. 4 and discussed further herein. In addition, each sidewall indention 102 indicates a desirable location for cutting or trimming the draft tube 22 to adjust a length thereof.

Each sidewall indention 102 extends continuously about the entire perimeter of its respective tube section (i.e., bottom tube section 94 and central tube section 96) generally in a plane perpendicular to the central axis "A." However, in other suitable aspects of the present invention, the sidewall indentions 102 may extend about only a portion of the tube section perimeter, may be discontinuous along its extension length, and/or may extend perimetrically in a manner other than being in a plane perpendicular to the central axis "A."

As shown in FIG. 5, the sidewall indentions 102 have a generally semicircular cross section that projects inwardly toward the central axis "A" such that an innermost extent defines a rib diameter 104 that is smaller than outer diameter 100. In a preferred embodiment, the outer diameter 100 is in a range between and including about five and thirty-seven hundredths of an inch (5.37") and about five and seventy-seven hundredths of an inch (5.77"). The rib diameter 104 is in a range between and including about five and sixteen hundredths of an inch (5.16") and about five and fifty-six hundredths of an inch (5.56"). However, in other aspects of the present invention, the diameters 100 and 104 may be any alternative measurement that enables the draft tube 22 to function as described herein. As such, as shown in FIG. 4, the sidewall indentions 102 define the inner rib 110 that abuts the diffuser body 180 when assembled into the aerator 16. However, in certain aspects of the present invention, the diffuser body 180 and the draft tube 22 can be configured such that the diffuser body 180 seats or otherwise seals against the inside surface of the draft tube sidewall 120.

Extending upward from bottom edges 112 and 114 of the bottom tube section 94 and the central tube section 96, respectively, are respective conduit receiving slots 106 and 108. The conduit receiving slot 106 of the bottom tube section 94 extends through the sidewall 120 of the draft tube 22. The conduit receiving slot 108 of the central tube section 96 is closed with the material used to fabricate the draft tube 22. In the exemplary embodiment, to adjust the overall length of the draft tube 22, for example, the bottom tube section 94 may be removed (e.g., cut off or trimmed away at the sidewall indention 102 from the central tube section 96) and the material closing the conduit receiving slot 108 may be removed or punched out. For example, and without limitation, in one suitable aspect of the present invention, the material closing the conduit receiving slot 108 may be cut away using a cutting tool. In other suitable aspects of the present invention, the outline of the conduit receiving slot 108 may define a plurality of weakened fracture lines enabling the material closing the conduit receiving slot 108 to be snapped or broken away, for example, by hand. As such, the length of the draft tube 22 may be adjusted but the bottom tube end 68 may retain substantially the same form such that the air supply assembly 24 may be coupled thereto in the same manner.

In the exemplary embodiment, the central aeration portion 90 has an outwardly stepped, tapered form as it extends upward a distance $L_2$ from the lower adjustable extension portion 88. As best shown in FIGS. 5, 7, and 8, according to the exemplary embodiment, the central aeration portion 90 includes a plurality of serially-arranged tube sections 122, 124, 126, 128, 130, 132, and 134 having generally constant diameters of 142, 144, 146, 148, 150, 152, and 154, respectively. Although the illustrated embodiment includes seven (7) tube sections defining the central aeration portion 90, other aspects of the present invention, may have fewer or more tube sections. In addition, in some suitable embodiments, the central aeration portion 90 may have a smooth, outwardly-tapered sidewall 120 or may have an outwardly-tapered sidewall 120 with one or more grooves extending upward along the sidewall 120 in a predetermined pattern, e.g., a spiral, a zig-zag, and the like.

In the exemplary embodiment, the tube section 122 extends upward from the attachment tube section 98 of the lower adjustable extension portion 88 and includes the one or more open windows 86 defined therein. Each of the one or more open windows 86 extends perimetrically about the draft tube 22 between two adjacent connecting fingers 136. In the exemplary embodiment, the draft tube 22 includes four (4) connecting fingers 136, although other suitable embodiments contemplate having fewer or more connecting fingers 136. The tube section 122 has a diameter 142, which in a preferred embodiment, is in a range between and including about five and seventy-four hundredths of an inch (5.74") and about six and fourteen hundredths of an inch (6.14"). However, in other aspects of the present invention, the diameter 142 may be any alternative measurement that enables the draft tube 22 to function as described herein.

The tube section 124 extends from the tube section 122 and has a diameter 144 that is larger than the diameter 142, therefore defining one inner lip 138 (shown in FIGS. 7 and 8) or step cooperatively defined by the tube sections 122 and 124. The inner lip 138 is generally defined in a plane that is perpendicular to the central axis "A." In a preferred embodiment, the diameter 144 is in a range between and including about six inches (6.00") and about six and forty hundredths of an inch (6.40"). However, in other aspects of the present invention, the diameter 144 may be any alternative measurement that enables the draft tube 22 to function as described herein.

The tube section 126 extends from the tube section 124 and has a diameter 146 that is larger than the diameter 144, therefore defining a plurality of arcuate-shaped inner lips 140 (shown in FIGS. 7 and 8) cooperatively defined by the tube sections 124 and 126. In a preferred embodiment, the diameter 146 is in a range between and including about six and twelve hundredths of an inch (6.12") and about six and fifty-two hundredths of an inch (6.52"). However, in other aspects of the present invention, the diameter 146 may be any alternative measurement that enables the draft tube 22 to function as described herein. Each arcuate-shaped inner lip 140 extends between adjacent fingers 136. It is noted that in other suitable aspects of the present invention, the inner lips 140 may have a form other than arcuate so long as the inner lips 140 enable the draft tube 22 to function as described herein.

In the exemplary embodiment, the connecting fingers 136 include longitudinally oriented ribs extending from the tube section 126 downwardly through the tube section 124 and 122 and into the attachment tube section 98 to provide support and connection between the lower adjustable extension portion 88 and the central aeration portion 90. The connecting fingers 136 are preferably spaced equidistant about the perimeter of the draft tube 22, being arranged at ninety degree (90°) points around the draft tube 22 with respect to the central axis "A." The connecting fingers 136 extend generally parallel to the central axis "A," each having a longitudinal width 156. In a preferred embodiment, the width 156 is in a range between and including about sixty-eight hundredths of an inch (0.68") and about one and eight hundredths of an inch (1.08"). However, in other aspects of the present invention, the connecting fingers 136 may extend longitudinally in a direction other than parallel to the central axis "A" and may be any alternative width 156 measurement that enables the draft tube 22 to function as described herein.

The tube section 128 extends from the tube section 126 and has a diameter 148 that is larger than the diameter 146, therefore defining an inner lip 158 (shown in FIGS. 7 and 8) cooperatively defined by tube sections 128 and 126. The inner lip 158 is one of a plurality of substantially similar inner lips 158 cooperatively defined by adjacent tube sections 124, 126, 128, 130, 132, and 134. In the exemplary embodiment, the inner lips 158 have a generally sinusoidal (or scalloped) form as each lip 158 extends about the perimeter of the draft tube 22. However, in other aspects of the present invention, the inner lips 158 may have any alternative shape that enables the draft tube 22 to function as described herein, including, for example, linear, zig-zag, and the like.

In the exemplary embodiment, each upwardly successive tube section 130, 132, and 134 of the central aeration portion 90 is the same construction as described above with respect to tube sections 126 and 128 with only the diameter measurements differing. The Table 1 below indicates the preferred range of each associated diameter 148, 150, 152, and 154, respectively.

| Diameter Reference Number | Minimum Diameter | Maximum Diameter |
| --- | --- | --- |
| Diameter 148 of Tube section 128 | 6.24" | 6.64" |
| Diameter 150 of Tube section 130 | 6.37" | 6.77" |
| Diameter 152 of Tube section 132 | 6.49" | 6.89" |
| Diameter 154 of Tube section 134 | 6.62" | 7.02" |

It is noted that in other aspects of the present invention, the diameters 148, 150, 152, and 154 may have any alternative measurement that enables the draft tube 22 to function as described herein.

The inner stepped lips 138, 140, and 158 function to provide sharp breaks along the inner surface of the sidewall 120 of the draft tube 22. Such sharp breaks facilitate dislodging any air bubbles attached to the sidewall 120 as the air bubbles rise with the influent. In addition, the sharp breaks facilitate breaking any such air bubbles into smaller bubbles, which in turn, facilitates increasing the oxygenation of the influent as the influent rises through the draft tube 22. Another advantage of the lips 138, 140, and 158 is that the lips provide additional stiffness or rigidity to the draft tube 22.

In the exemplary embodiment, the upper outlet portion 92 has a height of $L_3$ and includes the support flange 72, a generally smooth tapered sidewall 160 extending upward from the support flange 72, and an arcuate handle 162 projecting upward from and extending diametrically across a top edge 164 of the sidewall 160 at the tube top end 70. As described herein, the support flange 72 is configured to support the draft tube 22 (or, when assembled, the aerator 16) on top of the wastewater treatment media 58 (or other structure).

The handle 162 is coupled to the top edge 164 of the sidewall 160 and is substantially centered on the draft tube 22 with respect to the central axis "A," extending diametrically across the top tube end 70, as described above. The handle has a width 166 of about one and one-half inches (1.5") plus or minus about twenty hundredths of an inch (±0.20"). However, in other aspects of the present invention, the width 166 may be any alternative measurement that enables the draft tube 22 to function as described herein. As best shown in FIG. 5, the handle 162 has a concave, semicircular cross-sectional shape to define a semicircular indentation extending from both ends of the handle 162. The handle 162 (and therefore the indention) extends axially along the sidewall 160 downward to the support flange 72. In other aspects of the present invention, the handle 162 may have cross-sectional shapes other than semicircular.

Referring to FIG. 6, in the exemplary embodiment, the support flange 72 extends generally radially outward to a radius $R_1$. In a preferred embodiment, the radius $R_1$ is in the range between and including about four and five hundredths of an inch (4.05") and about four and forty-five hundredths of an inch (4.45"). However, in other aspects of the present invention, the radius $R_1$ may be any alternative measurement that enables the draft tube 22 to function as described herein.

The support flange 72 includes four (4) radially extending arms 168 extending outward from the radius $R_1$ a radial distance of $R_2$. As described herein with respect to the connecting fingers 136, the arms 168 are preferably spaced equidistant about the perimeter of the draft tube 22, being arranged at ninety degree (90°) points around the draft tube 22 with respect to the central axis "A." Each of the arms 168 has a generally continuous radial width 170. In a preferred embodiment, the width 170 is in a range between and including about four and eighty hundredths of an inch (4.80") and about five and twenty hundredths of an inch (5.20"). In addition, radial distance $R_2$ is in a range between and including about eleven and eighty hundredths of an inch (11.80") and about twelve and twenty hundredths of an inch (12.20"). However, in other aspects of the present invention, the width 170 and the radial distance $R_2$ may be any alternative measurement that enables the draft tube 22 to function as described herein. It is noted that in the exemplary embodiment, each arm 168 is generally aligned vertically with a connecting finger 136. However, in other aspects of the present invention, the arms 168 may be rotationally clocked with respect to the connecting fingers 136 any amount that enables the draft tube 22 to function as described herein.

The support flange 72 includes an air supply conduit-receiving hole 172 extending axially therethrough and defining an axis "B" that is substantially parallel to the central axis "A" of the draft tube 22. The conduit-receiving hole 172 has a diameter $D_1$, which is generally concentric with the concave, semicircular cross-sectional form of the handle 162, as viewed along the central axis "A" of the draft tube (see FIG. 6). In a preferred embodiment, the diameter $D_1$ is in a range between and including about one inch (1.00") and about one and forty hundredths of an inch (1.40"). However, in other aspects of the present invention, the diameter $D_1$ may be any alternative measurement that enables the draft tube 22 to function as described herein. As will be described further herein, the conduit-receiving hole 172 is configured to locate the air supply conduit 184 of the air supply assembly 24.

In the exemplary embodiment, the draft tube 22 is a molded component that is substantially tubular in form, having a generally constant wall thickness $T_1$, as described herein. The draft tube 22 is fabricated by a rotary molding process, which uses centrifugal force to mold the substantially hollow component against an inside surface of a mold. The draft tube may be fabricated from a thermoplastic polymer suitable for use in a septic tank environment. Accordingly, the features of the draft tube 22 described herein may have a draft angle associated with a respective feature to promote removal of the draft tube 22 from a mold. The draft tube 22 may be suitably fabricated from a high-density polyethylene (HDPE). However, in other aspects of the present invention, the draft tube 22 may be fabricated from any material that enables to draft tube 22 to function as described herein. Furthermore, the draft tube 22 may be fabricated by methods other than molding, e.g., machining, and therefore may not have a draft angle associated with the features as described herein.

During the molding process, the bottom tube end 68, the top tube end 70, the one or more open windows 86, and the conduit receiving slots 106 and 108 may be closed by material used to fabricate the draft tube 22. After completion of the molding process, the material closing the bottom tube end 68, the top tube end 70, the one or more open windows 86, and the conduit receiving slot 106 may be removed, i.e., trimmed or cut from the draft tube 22 to define these features. By molding the draft tube 22 as a unitary component, a significant cost savings is realized due to reduced assembly labor and component costs.

Figure 9:
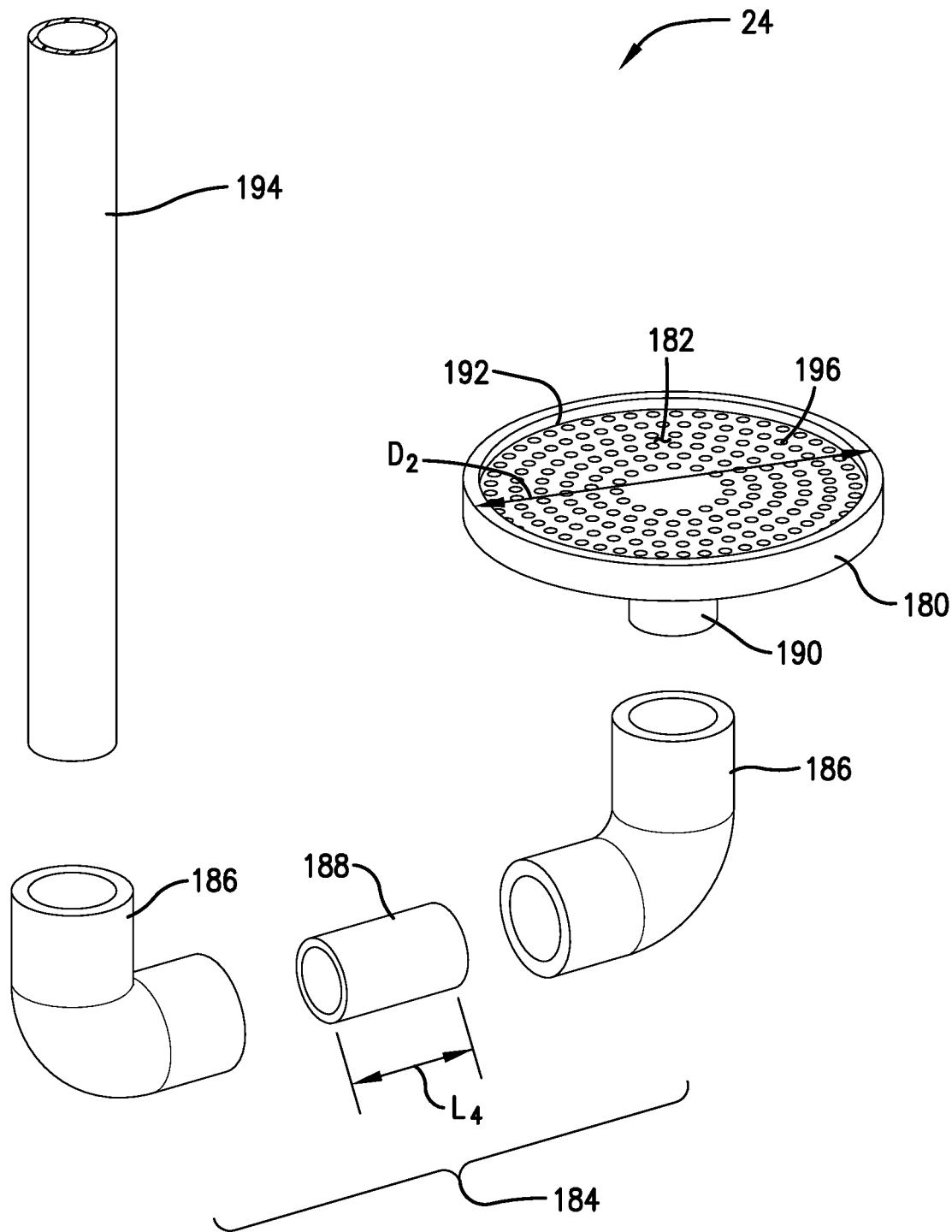
FIG. 9 is an exploded perspective view of a portion of the air supply assembly shown in FIGS. 2-4.

FIG. 9 is an exploded perspective view of the air supply assembly 24 shown in FIGS. 2-4. As described herein, the air supply assembly 24 includes the diffuser body 180 with the bubble generator 182, preferably in the form of an upwardly facing bubble generating surface, and the air supply conduit 184. In the exemplary embodiment, the air supply conduit 184 includes a pair of elbow conduit sections 186, a cross conduit section 188 extending between the pair of elbow conduit sections 186, and an upright conduit section 194. In one suitable embodiment, the upright conduit section 194, the elbow conduit sections 186, and the cross conduit section 188 are fabricated from standard one half inch (0.5") schedule forty polyvinyl chloride (PVC). Each elbow conduit section 186 defines a bend of about at ninety degrees (90°), such that when assembled, the air supply conduit 184 has a generally U shape. The cross conduit section 188 has a predetermined length $L_4$ that facilitates centering the diffuser body 180 on the central axis "A" of the draft tube when assembled into the aerator 16, as shown in FIG. 4, while simultaneously positioning the centerline of the upright conduit section 194 on the axis "B" of the conduit-receiving hole 172. The upright conduit section 194, the elbow conduit sections 186, and the cross conduit section 188 may be assembled together using typical PVC solvent bonding, as is well known, to form the air supply conduit 184. However, in other aspects of the present invention, the upright conduit section 194, the elbow conduit sections 186, and the cross conduit section 188 may be fabricated from any tubular material that enables the air supply assembly 24 to function as described herein, including, for example, being fabricated as a unitary component from a single piece of tubular material.

The diffuser body 180 is generally a rigid, unitary component that includes the inlet 190 configured to couple to one of the elbow conduit sections 186 for channeling air to the bubble generator 182. The inlet 190 is tubular, having a bore defined therethrough, and is fluidly connected to an internal chamber for distributing an air flow across the diffuser body 180. In one suitable embodiment, the diffuser body 180 is preferably a unitary component fabricated from a rigid resin material, such as a HDPE, PVC, and the like. However, in other aspects of the present invention, the diffuser body 180 may be fabricated from any material that enables the air supply assembly 24 to function as described herein, including, for example, a high durometer rubber (such as styrene-butadiene), a metal, and the like. As shown in FIG. 9, the diffuser body 180 has an outer peripheral diameter of $D_2$. The outer peripheral diameter of $D_2$ is larger than the inner diametrical dimension of the sidewall indentions 102 yet is small enough to enable the diffuser body 180 to be fitted into the draft tube 22 at the bottom tube end 68, as shown in FIG. 4 and described below.

In the exemplary embodiment, the bubble generator 182 is positioned on the upward facing side of the diffuser body 180, opposite the inlet 190, to facilitate distributing air bubbles into the influent flowing into the draft tube 22. In the exemplary embodiment, the bubble generator 182 is generally sealed to the upward facing side of the diffuser body 180 at a peripheral edge 192 of the diffuser body 180, i.e. coupled in a manner that forms a barrier to prevent a fluid from passing therebetween at the peripheral edge 192. In one suitable embodiment, the bubble generator 182 may be fabricated from a resilient elastomeric membrane material that includes a plurality of air openings 196 or perforations extending therethrough to the internal chamber of the diffuser body 180. However, in other aspects of the present invention, the bubble generator 182 may be fabricated from a rigid material, including, for example, a ceramic, a plastic, a metal, and the like. In one suitable embodiment, the bubble generator 182 may include a nonperforated region positioned opposite from the inlet 190 and/or may include a varying hole distribution across the bubble generator 182. A nonperforated region may advantageously operate as a check valve to close off the inlet 190, thereby preventing backflow of the influent liquid through the inlet and into the air supply assembly 24 when there is no air flow through the air supply assembly 24.

It is noted that in one suitable embodiment, the diffuser body 180 and the bubble generator 182 may be fabricated as a single, unitary component. Furthermore, it is noted that while the exemplary diffuser body 180 and bubble generator 182 are illustrated as being circular is shape, the components may be fabricated in any other shape that enables the air supply assembly 24 to function as described herein, including, for example, a rectangular, oval, or other polygonal shape.

During assembly of the aerator 16, the air supply assembly 24 is coupled to the draft tube 22. In particular, the air supply conduit 184 is inserted upward through the conduit-receiving hole 172 defined in the support flange 72, and the diffuser body 180 is inserted upward into the bottom tube end 68 of the draft tube 22. In one suitable embodiment, the outer peripheral diameter $D_2$ of the diffuser body 180 is sized to form an interference fit with the inner surface of the sidewall 120 of the draft tube 22, which forms a seal therebetween. As used herein, the phrase "interference fit" means a value of tightness between the outer peripheral edge of the diffuser body 180 and the draft tube 22, i.e., an amount of radial clearance between the two components. A negative amount of clearance is also commonly referred to as a press fit, where the magnitude of interference determines whether the fit is a light interference fit or an interference fit. A small amount of positive clearance is referred to as a loose or sliding fit. In other aspects of the present invention, the outer peripheral diameter $D_2$ of the diffuser body 180 is sized to form a loose or sliding fit with the draft tube 22. In such embodiments, the diffuser body 180 may be coupled to the draft tube 22 using, for example, an adhesive bond, such as a silicone, an adhesive, and the like, to form a seal therebetween.

Closing or sealing the bottom tube end 68 of the draft tube 22 with the diffuser body 180 facilitates increasing the length of the draft tube 22 such that the draft tube may extend into a sludge settling region of the influent in the second chamber 40 of the septic tank 12. The bubble generator 182 is protected against becoming clogged by the sludge in the influent due to the seal between the peripheral edge of the diffuser body 180 and the draft tube 22. Further, the sidewall 120 is extended in length as compared to traditional draft tubes, thereby increasing the path for mixing the fine air bubbles with the influent. As such, a lower power, higher efficiency blower unit 18 may be used with the wastewater treatment system 10.

Referring to FIGS. 1-9, in operation, wastewater containing biodegradable waste, generally in both dissolved and undissolved forms, is channeled to the septic tank 12 as a sewage influent flow. The influent enters the septic tank 12 through the influent pipe 42. The influent passes into the first chamber 38, which functions as a first settling and anaerobic digestion chamber. Within the first chamber 38, floatable biodegradable waste is degraded on the surface of the influent volume and non-floatable biodegradable waste settles to the bottom of the first chamber 38. Within the first chamber 38, the biodegradable waste is digested by anaerobic bacteria.

The influent passes from the first chamber 38 to the second chamber 40 through one or more openings defined in the dividing wall 36. The second chamber 40 functions as a second settling and anaerobic digestion chamber. Within the second chamber 40, any remaining floatable biodegradable waste is degraded on the surface of the influent volume and any remaining non-floatable biodegradable waste settles to the bottom of the second chamber 40. The biodegradable waste is digested by anaerobic bacteria.

Within the second chamber 40, the influent is channeled into the wastewater treatment module 14 through the one or more bottom openings 54 defined through the shell bottom wall 56. In addition, a portion of the influent is conducted upwardly through the draft tube 22 of the aerator 16. The upward movement of the influent is produced by an upwardly rising stream of fine air bubbles introduced into the draft tube 22 by the air supply assembly 24 to hydraulically lift the influent upward through the top tube end 70. The fine air bubbles facilitate oxygen transfer efficiency (the amount of energy required to put air into the wastewater) so that less energy is required to conduct oxygenation of the influent.

At the top tube end 70 of the draft tube 22, the upwardly conducted influent is distributed in a relatively even manner over the wastewater treatment media 58. The distributed influent passes downwardly through the wastewater treatment media 58 as additional influent is conducted upwardly through the draft tube 22. As the influent passes through the wastewater treatment media 58, the biodegradable waste is aerobically digested by microorganisms growing on the surface of the wastewater treatment media 58. Any remaining biodegradable waste that is released from the wastewater treatment media 58 passes downwardly into the second chamber 40, where the biodegradable waste may be periodically collected. Thus, the influent is generally continuously recirculated through the wastewater treatment module 14 by the aerator 16. The recirculation of the influent typically occurs a number of times before the wastewater is expelled from the septic tank 12 as an effluent flow through the effluent pipe 48.

A portion of the influent expelled from the top tube end 70 of the draft tube 22 falls onto the recirculation trough 74 where it is channeled by the recirculation trough 74 from within the wastewater treatment module 14 back into the second chamber 40 of the septic tank 12. As the influent passes upward through the draft tube 22, it is aerated, i.e., air introduced by the air supply assembly 24 is mixed and/or dissolved in the influent. The aerated influent in the recirculation trough 74 is recycled back into the second chamber 40 in order to facilitate denitrifying the nitrate rich influent by deoxygenating dissolved nitrates and to facilitate equalizing the biochemical oxygen demand (BOD) load in the wastewater treatment module 14.

Advantageously, embodiments of the present invention serve to increase the oxygenation of influent as it is channeled upward through a stepped draft tube by mixing the influent with a well dispersed plurality of fine air bubbles discharged by a fine air bubble diffuser coupled to the lower end of a draft tube. The bubble diffuser seals or closes the lower end of the draft tube, enabling the length of the draft tube to be fabricated with an increased length, which further promotes oxygenation of influent. Another advantage of the present invention is the use of steps or lips along the draft tube sidewall to further increase the ability of the air to mix with the influent. The use of such a fine bubble diffuser with an extended length, stepped draft tube facilitates increasing the efficiency of the wastewater treatment system while also decreasing the cost associated with the blower unit.

Although the above description presents features of preferred embodiments of the present invention, other preferred embodiments may also be created in keeping with the principles of the invention. Such other preferred embodiments may, for instance, be provided with features drawn from one or more of the embodiments described above. Yet further, such other preferred embodiments may include features from multiple embodiments described above, particularly where such features are compatible for use together despite having been presented independently as part of separate embodiments in the above description.

Those of ordinary skill in the art will appreciate that any suitable combination of the previously described embodiments may be made without departing from the spirit of the present invention.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

What is claimed is:

1. An aerator assembly for wastewater treatment, said aerator assembly comprising:
   an upright draft tube including a sidewall and presenting an open top tube end and an open bottom tube end,
   said sidewall including a circumferential groove that defines an inwardly projecting rib adjacent the bottom tube end; and
   an air supply assembly including an air supply conduit connectable to a source of air,
   said air supply assembly further including a diffuser body that has an inlet aperture and a bubble generator fluidly connected to the inlet aperture,
   said inlet aperture being fluidly connected to the air supply conduit such that the bubble generator is configured to receive air from the source of air,
   said bubble generator comprising a plurality of air openings,
   said diffuser body enclosed within the sidewall and having a periphery that sealingly engages the rib so as to restrict an upward flow of wastewater through the draft tube past the diffuser body.

2. The aerator assembly in accordance with claim 1, said air supply assembly being releasably connectable to the draft tube.

3. The aerator assembly in accordance with claim 1, said diffuser body presenting an internal chamber communicating with the inlet aperture,
   said bubble generator comprising an upwardly facing surface, with the air openings extending through the surface and communicating with the internal chamber.

4. The aerator assembly in accordance with claim 3, said upwardly facing surface comprising a resilient elastomeric membrane having the air openings defined therein.

5. The aerator assembly in accordance with claim 4, said upwardly facing surface including a nonperforated region opposite the inlet aperture.

6. The aerator assembly in accordance with claim 1, said sidewall including an open window spaced from the top tube end,
   said groove being spaced between the window and the bottom tube end, such that air moving upwardly toward the top tube end is operable to draw the wastewater into the draft tube through the open window.

7. The aerator assembly in accordance with claim 1, said sidewall including an open window spaced between the diffuser body and the top tube end, such that air moving upwardly toward the top tube end is operable to draw the wastewater into the draft tube through the open window.

8. The aerator assembly in accordance with claim 7, said sidewall including a first portion located above the open window,
   said first portion of the sidewall being sectioned into a plurality of variably cross-sectionally dimensioned tube sections, such that the sidewall presents an internal step between adjacent ones of the tube sections.

9. The aerator assembly in accordance with claim 8, said sidewall including a second portion located below the window, with the second portion of the sidewall having a plurality of vertically spaced conduit-receiving slots,
   said air supply conduit being selectively received in a respective one of the conduit-receiving slots to position the diffuser body within the draft tube, with vertical spacing of the diffuser body relative to the top tube end being variable depending on the conduit-receiving slot in which the air supply conduit is received.

10. The aerator assembly in accordance with claim 9, said draft tube including a handle projecting from the top tube end.

11. The aerator assembly in accordance with claim 1, said sidewall including a portion located above the diffuser body,
    said portion of the sidewall being sectioned into a plurality of variably cross-sectionally dimensioned tube sections, such that the sidewall presents an internal step between adjacent ones of the tube sections.

12. The aerator assembly in accordance with claim 1, said sidewall having a plurality of vertically spaced conduit-receiving slots,
    said air supply conduit being selectively received in a respective one of the conduit-receiving slots to position the diffuser body within the draft tube, with vertical spacing of the diffuser body relative to the top tube end being variable depending on the conduit-receiving slot in which the air supply conduit is received.

13. The aerator assembly in accordance with claim 12, wherein said circumferential groove is a plurality of circumferential grooves, each of which defines a portion of the draft tube in which a corresponding one of the conduit-receiving slots is located,
    said periphery of said diffuser body sealingly engages the rib of the corresponding one of the grooves.

14. The aerator assembly in accordance with claim 1, said draft tube including a handle projecting from the top tube end.

15. The aerator assembly in accordance with claim 14, said sidewall including a support flange configured to rest against a structure on which the draft tube is supported,
    said handle being located above the support flange to facilitate installation and removal of the draft tube relative to the structure.

* * * * *